A. C. KETCHUM.
Tea Kettle.
No. 25,742.
Patented Oct. 11, 1859.
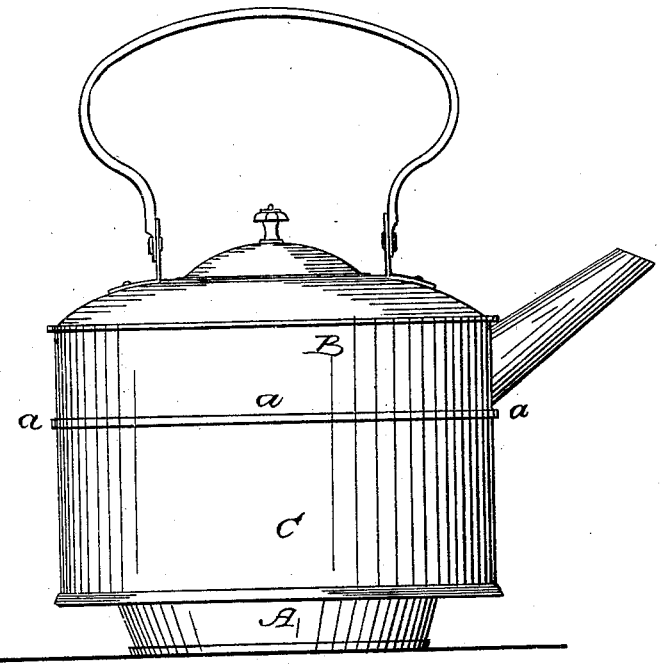
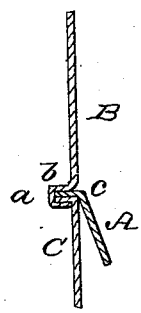
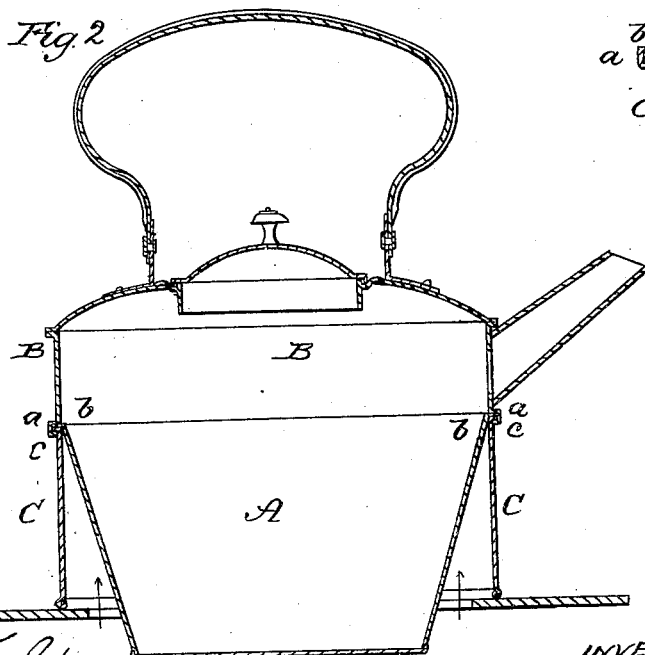

UNITED STATES PATENT OFFICE.

ARCHIBALD C. KETCHUM, OF NEW YORK, N. Y.

TEA-KETTLE.

Specification of Letters Patent No. 25,742, dated October 11, 1859.

*To all whom it may concern:*

Be it known that I, ARCHIBALD C. KETCHUM, of the city, county, and State of New York, have invented a new and useful Improvement in Making Tea-Kettles; and I do hereby declare that the following is a full, clear, and exact description thereof, reference being had to the accompanying drawings, and to the letters of reference marked thereon, in which—

Figure 1 shows a side view of the kettle. Fig. 2 is a vertical cross section. Fig. 3 is the lap-joint.

My invention is an improvement in the manufacture of that class of tea kettles which are provided with a skirt or jacket proceeding down from the rim of the kettle, and surrounding the same, for the purpose of economizing heat in boiling water by allowing it to pass up and around the sides of the receptacle containing the water. Heretofore great difficulty has arisen in making this variety of kettle to withstand exposure to the fire without being injured thereby, for it will be readily seen that if the jacket be soldered on, as soon as the water in the kettle gets below this point the increased heat will melt the solder, and the jacket will drop off. While by riveting the jacket to the kettle it requires great nicety to make a tight joint, besides adding to the expense of the kettle. This, with the solder joint, have both been found impracticable in attaching the jacket to the body of the kettle, and, for this reason, surrounding the kettle with a jacket was soon abandoned.

My invention consists in making the body of a kettle of three parts—copper, tin, and a sheet iron jacket—and in uniting these parts together in one joint so as to be perfectly water tight, and, at the same time, so as not to be injured by the heat should the water in the kettle get below this joint.

In making this kettle the bottom, A, is to be of copper; the top, B, of tin; and the flange or jacket, C, of sheet iron (Russia iron). This insures the kettle against speedily rusting and burning out, that part of it which is exposed to the heat of the fire being of a much more durable metal.

The body of the kettle is made of the usual form and presents the appearance of the common flanged kettle, with the exception that it is composed of the three different metals, as above mentioned, having a horizontal bead formed at the point where they are united.

The mode of uniting the three parts constituting the body of the kettle so as to form one joint will be understood by reference to Fig. 3. The top part, B, which is of tin is placed in a suitable bending machine and the lap, a, formed on its edge. The edges of the copper bottom of the kettle, and the jacket, C, are bent, as shown by Fig. 3, b, c being the bent portions or flanges which are inserted into the portion, a, of the tin top, B, and the whole united securely and tightly together by hammering down the lapped portion, a. It will be clearly seen that this joint can be readily made and that with proper tools made perfectly, while it possesses the additional advantage that if the bottom should wear out it can be readily removed by a tinsmith and a new one substituted at a comparatively small cost, and thus make the top and flange of this kettle serve for years.

If this kettle be placed on a stove opening, which is of a larger diameter than the bottom, it will readily be seen how the heat will pass up, and circulate around a great portion of that part of the kettle containing water so as to boil the vessel much sooner than if the bottom of the kettle only was exposed to the fire.

These kettles, made after the manner above shown, are in their first cost as cheap as those generally sold in the market; and, in point of economy, the saving of fuel, and their durability over the old kettle will give them a ready sale, and bring them in great demand.

I wish to distinctly disclaim surrounding a tea kettle with a jacket or flange, for this will be found in several instances already in the Patent Office. I also disclaim making a kettle of this kind wholly of either tin, sheet iron, copper, or any other metal; but What I do claim as my invention, and desire to secure by Letters Patent, is:—

The combination of the tin top, copper bottom, and sheet iron skirt when the same are all united by one and the same lap-joint, and just below the spout of the kettle, as described and represented, constituting a new article of manufacture.

ARCHIBALD C. KETCHUM.

Witnesses:
R. S. SPENCER,
WM. TUSCH.